United States Patent Office 3,496,602
Patented Feb. 24, 1970

3,496,602
COMBINATION OF A MOULD AND A DEVICE FOR EXERTING A COMPRESSIVE STRESS ON THE MOULD
Gerardus Stephanus Gruintjes and Wilhelmus Cornelis Petrus Maria Meerman, Emmasingel, Eindhoven, Netherlands, assignors to U.S. Philips Corporation, New York, N.Y., a corporation of Delaware
Filed Feb. 7, 1967, Ser. No. 614,441
Claims priority, application Netherlands, Feb. 10, 1965, 6601665
Int. Cl. B29c 3/00
U.S. Cl. 18—16.5          4 Claims

ABSTRACT OF THE DISCLOSURE

An apparatus for moulding small articles. A low tensile strength, high wear ceramic mould is combined with a device for compressively stressing the mould so that pressurized mould material will not rupture the mould. The compressive stressing device includes an annular body surrounding the mould and a plurality of pressure members attached to the annular body. The pressure members develop a force which is transmitted to the periphery of the mould placing the mould in compression.

---

Figure 1:
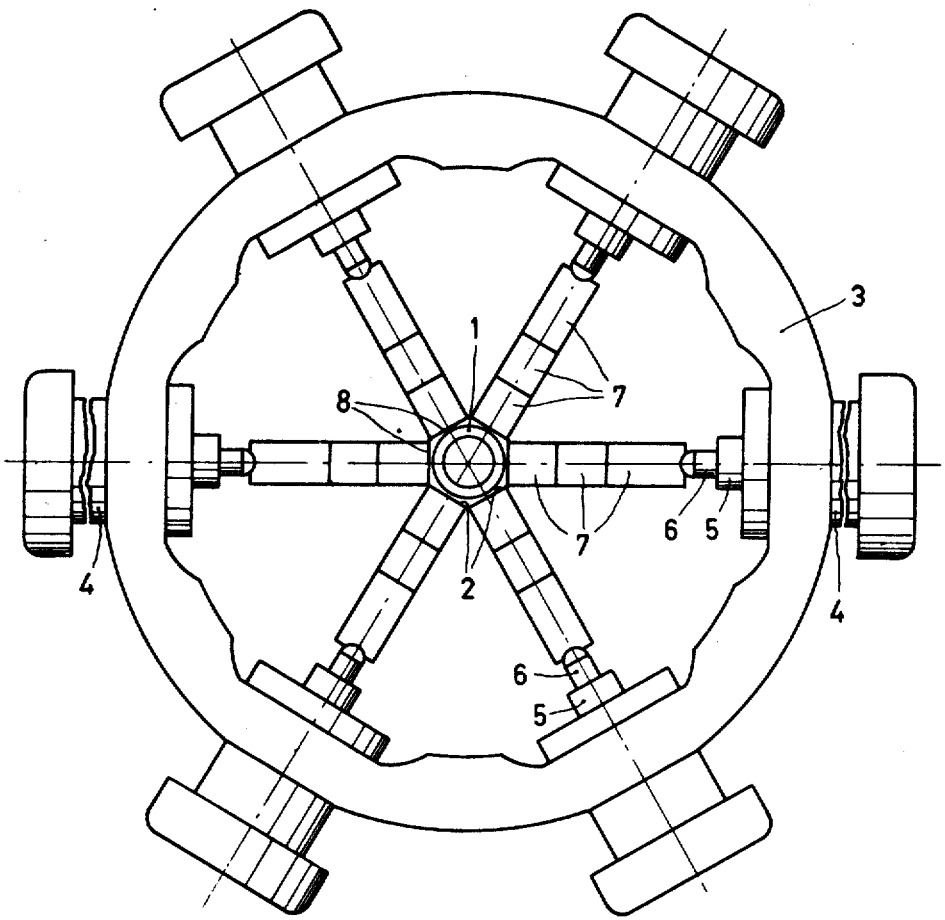

The invention relates to a combination of a mould and a device for exerting a compressive stress on the mould, wherein the mould has a cavity for receiving pressurized material.

When material is moulded in a moulding cavity, high stresses may be produced in the wall of the mould. This is the case, for example, when pulverulent materials are sintered at high pressure (hot-pressing). The pressure is very high and the temperature is lower than the usual sintering temperature. With hot-pressing, a product of very great density is obtained, while the growth of the grains is extremely small due to the comparatively low temperature. In order to reduce the amount of wear of the mould use is frequently made of ceramic moulds. For example, a mould of alumina has a very high degree of hardness and a high resistance to wear, is fairly capable of withstanding high temperatures and is chemically resistant to a great variety of gases and materials to be processed. Ceramic materials are capable of withstanding only a comparatively low tensile stress, especially when high temperatures are used.

The invention has for its object to provide a combination of a mould and a device for exerting a compressive stress on the mould, in which the mould can be used for a long time without the mould being liable to damage or breakdown.

According to the invention, the outer wall of the mould is prism-shaped and the device for applying compressive stresses to the mould consists of an annular body which surrounds the mould and which includes adjustable pressure members operative in a direction substantially at right angles to the side faces of the prism and which act upon pressure dies disposed between each of the side faces of the mould and each of the pressure members. The wall surface of each pressure die has a flat shape, which corresponds in size and shape to the cooperating side face of the mould. Due to the fact that the outer wall of the mould consists of a plurality of flat side faces and the pressure dies have corresponding flat walls, application of a uniform compressive stress on the mould is ensured. The value of the compressive stress to be applied to the mould is subject to the pressure to which the material in the mould is subjected.

In one embodiment of the invention, each of the pressure members includes a plunger which is displaceable in a cylinder and which has one end connected to a pressure pin acting upon the pressure die. The cylinders are connected to a high pressure fluid supply duct. Thus, a uniform pressure on the side faces of the mould can be obtained in a simple manner.

In a further embodiment of the invention, each pressure member consists of a rod which is displaceable in a guide and to which a pressure pin is connected, while at least one resilient member adjustable by means of a screw member acts upon the said rod. The pressure on each of the side faces of the mould can be adjusted independently.

In an embodiment of the invention, a heating member for the mould consists of a helical heater which is arranged in a helical groove in one of the surfaces of the mould. Thus, the mould can be heated in a simple manner.

In one embodiment of the invention, the pressure dies cooperating with the wall of the mould consist of the same material as the mould. In the case of a heated mould, this affords the advantage that the coefficient of expansion of the mould and that of the pressure dies is the same. Also, in the case of expansion or shrinkage in the longitudinal direction of the mould, the pressure dies will not exert frictional forces on the mould.

Figure 2:
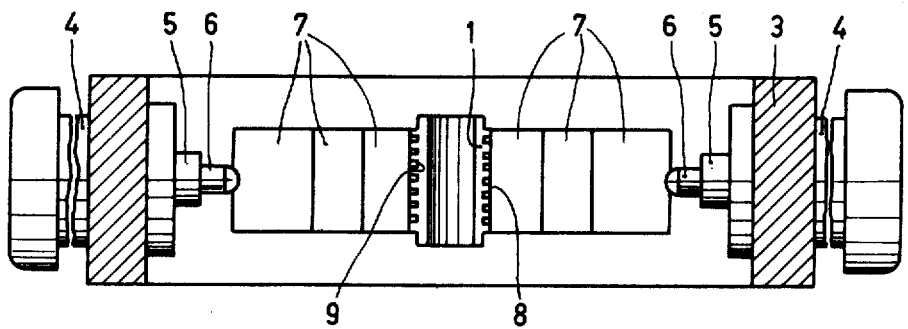

The invention will now be described more fully with reference to the drawing, in which:

FIG. 1 is a plan view of the mould and the device for compressively stressing the mould, and FIG. 2 is a cross-sectional view of mould and stressing device of FIG. 1.

A mould 1 is provided with a cylindrical moulding cavity and with a prism-shaped outer wall. The cross-section of the prism is shown in FIG. 1 in the form of a regular hexagon. The outer wall of the mould 1 thus has six side faces 2 which has a flat shape. The mould 1 is surrounded by an annular body 3. At regular distances, pressure members 4 are provided in this annular body. The pressure members 4 shown in the drawing consist of a cylinder in which a plunger 5 is adapted to move. The plunger 5 has connected to it a pressure pin 6 which acts upon pressure dies 7. In the drawing, three pressure dies 7 are disposed between each pressure pin 6 and each side face 2 of the mould. It should be noted that it is not necessary to include three pressure dies on all applications. The number of pressure dies to be used is dependent upon the dimensions of the device being compressed. Both the side faces 2 of the mould 1 and the surfaces 8 of the pressure dies 7 co-operating with the side face have a flat shape. As a result, it is ensured that the pressure dies engage the mould over the entire surface.

When high-pressure liquid is permitted to enter the cylinders of the pressure members 4, the pressure dies 7 are pressed via the plungers 5 and the pressure pins 6 against the side faces 2 of the mould. As a result, the mould is subjected to compressive stress. The stressing force applied to the mould by the pressurized cylinder may be chosen so that the mould is always compressively stressed regardless of the pressure applied to the mould by the mould material disposed within the cavity. Consequently, the mould can be made of a very hard material having a high resistance to wear such as alumina, although such a material is not capable of withstanding high tensile stresses. When all the cylinders of the pressure members 4 are connected to the same high-pressure liquid source, a uniform pressure on each of the side faces of the mould can be achieved in a simple manner.

The pressure members may also be constructed in a different manner. Instead of utilizing a plunger adapted to move in a cylinder at liquid pressure as shown in FIG. 1, the pressure members may consist of a rod (not shown) which is displaceable in a guide and to which a pressure pin is connected. Resilient members preferably taking the form of cupped spring washers act upon the rod and may be subjected to stress by an adjustable screw. The pressure on each of the side faces 2 of the mould is then independently adjustable.

A heating member for the mould may consist, for example, of a helical heater which is arranged in a groove 9 in the outer surface of the mould.

What is claimed is:

1. The combination of a mould and an apparatus for exerting a uniform compressive pressure on said mould, comprising a ceramic mould having a cylindrical central cavity and polygonal shaped outer side walls, an annular body surrounding the mould, pressure members positioned in said annular body, plunger members capable of being activated by said pressure members for movement in a radial direction, pressure dies of the same material as the mould interposed between the mould and the plunger members said pressure dies having a flat surface for engaging the entire side wall of the mould to apply uniform compressive pressure so as to relieve any tensile stress in the mould.

2. The combination as claimed in claim 1 wherein a heater member is arranged in the outer side walls of the mould.

3. The combination as claimed in claim 2 wherein there are a plurality of pressure dies for each plunger member the number used being dependent on the dimensions of the mould.

4. The combination as claimed in claim 3 further comprising a pressure pin affixed to the plunger member for transmitting the pressure from the plunger member to the pressure dies.

References Cited

UNITED STATES PATENTS

| | | |
|---|---|---|
| 2,990,602 | 7/1961 | Brandmyr et al. |
| 3,107,395 | 10/1963 | Bundy. |
| 3,159,876 | 12/1964 | Hall. |
| 3,303,533 | 2/1967 | King. |

WILLIAM J. STEPHENSON, Primary Examiner

PO-1050
(5/69)

UNITED STATES PATENT OFFICE
CERTIFICATE OF CORRECTION

Patent No. 3496602          Dated Feb. 24, 1970

Inventor(s) G.S. GRUINTJES and W.C.P.M. MEERMAN

It is certified that error appears in the above-identified patent and that said Letters Patent are hereby corrected as shown below:

Column 1, line 10, "Feb. 10, 1965" should read

--Feb. 10, 1966--

Signed and Sealed this 14th day of July, 1970.

(SEAL)
Attest:

Edward M. Fletcher, Jr.
Attesting Officer

WILLIAM E. SCHUYLER, JR.
Commissioner of Patents